United States Patent [19]

Culler

[11] Patent Number: 4,658,335

[45] Date of Patent: Apr. 14, 1987

[54] RESILIENT MOUNTING MECHANISM FOR VEHICLE TAIL LIGHTS

[76] Inventor: Daniel L. Culler, 334 Jean St., SW., Wyoming, Mich. 49508

[21] Appl. No.: 482,841

[22] Filed: Apr. 7, 1983

Related U.S. Application Data

[63] Continuation-in-part of Ser. No. 310,741, Oct. 13, 1981, abandoned.

[51] Int. Cl.⁴ .............................................. F21V 25/00
[52] U.S. Cl. ......................................... 362/80; 362/82; 362/369; 362/83; 362/371; 362/269; 362/396; 362/287; 362/427
[58] Field of Search ....................... 362/61, 80, 82, 83, 362/269, 285–287, 369–371, 396, 427, 418; 180/1 R; 248/617, 626, 627, 628

[56] References Cited

U.S. PATENT DOCUMENTS

| | | | |
|---|---|---|---|
| 1,294,968 | 2/1919 | Taylor | 362/396 |
| 1,644,945 | 10/1927 | Pattison | 362/82 |
| 2,254,790 | 9/1941 | Benton | 362/82 X |
| 2,312,300 | 2/1943 | Baerwald | 362/78 X |
| 2,546,226 | 3/1951 | Laizure | 173/328 |
| 2,704,112 | 3/1955 | Rice | 248/626 X |
| 2,729,373 | 1/1956 | Stump | 224/42.03 |
| 2,731,544 | 3/1956 | Kayser, Sr. | 240/7.1 |
| 2,781,443 | 2/1957 | Cargle | 240/8.2 |
| 2,921,393 | 1/1960 | Wood | 248/628 X |
| 2,992,321 | 7/1961 | Robbins | 240/7.1 |
| 3,342,441 | 9/1967 | Danielson | 248/42 |
| 3,367,548 | 2/1968 | Cooper | 224/42.03 |
| 3,736,417 | 5/1973 | Williams | 240/78 |
| 4,058,720 | 11/1977 | Renfrow | 362/82 |
| 4,091,442 | 5/1978 | Markey | 362/390 |
| 4,234,908 | 11/1980 | McGee | 362/66 |
| 4,319,764 | 3/1982 | Whitacre | 362/64 X |
| 4,364,450 | 12/1982 | Kemp et al. | 248/628 X |

Primary Examiner—Peter A. Nelson
Attorney, Agent, or Firm—John A. Waters

[57] ABSTRACT

A resilient mounting mechanism for suspending vehicle tail lights from a vehicle comprises a transverse mounting bracket in which the vehicle tail lights are mounted and a resilient suspension mechanism for suspending the mounting bracket from the vehicle for deflection in a forward, backward, or either sideways direction when the mounting bracket encounters an obstruction. The mounting bracket preferably comprises a mounting plate having raised edges around the periphery thereof that protect the vehicle tail lights from striking an obstruction. The resilient suspension mechanism comprises one or more spring members attaching the mounting plate to the vehicle. The spring member holds the mounting bracket in a substantially stable position during normal conditions but permits deflection when the mounting plate strikes an obstruction. In one embodiment, an elastic damper covers the spring member to further restrict vibration of the mounting bracket and enhances the stability of the tail light assembly.

21 Claims, 10 Drawing Figures

RESILIENT MOUNTING MECHANISM FOR VEHICLE TAIL LIGHTS

CROSS REFERENCE TO RELATED APPLICATION

This application is a continuation-in-part of applicant's co-pending application Ser. No. 310,741, filed Oct. 13, 1981 now abandoned.

BACKGROUND OF THE INVENTION

1. Field of the Invention:

This invention relates to a mounting mechanism for vehicle tail lights and more particularly to a resilient vehicle tail light mounting mechanism that permits deflection of the vehicle tail lights relative to the vehicle without damaging the tail lights or the mounting mechanism.

2. Description of the Prior Art:

In most semi-trailers, tail lights are mounted on fixed brackets suspended downwardly from transverse cross members positioned at the rear of the vehicle. These tail lights are in a vulnerable position, and frequently the tail lights are broken or the mounting frames are bent or broken when the vehicle is being manuevered and the mounting bracket strikes a loading platform or the like.

Some attempts have been made to obviate these problems. Some side lights of vehicles are attached by elongated strips of rubber or leather. This permits the lights to be deflected out of the way but it also permits the lights to vibrate or swing back and forth during normal operation of the vehicle, which is undesirable. Also, some devices have been developed which permit the vehicle light itself to telescope resiliently into a fixed mounting bracket for the vehicle light if the tail light strikes an obstacle before the mounting bracket. Such devices are of questionable utility and in any event do not prevent damage to both the tail light and bracket if the bracket also strikes the obstacle. Such devices also present a problem in that the mounting mechanisms can collect dirt and ice and other road debris, thus permitting corrosion and possibly impairing of the function of the device.

SUMMARY OF THE INVENTION

The present invention overcomes the deficiencies in the prior art devices and provides a simple yet effective mounting mechanism for resiliently suspending vehicle tail lights from a vehicle.

In accordance with the present invention, a resilient mounting mechanism for suspending a vehicle tail light from a vehicle comprises a resilient suspension mechanism for connecting the tail light with the vehicle. The suspension mechanism includes a spring member made of a resiliently yieldable material, such as spring steel, and is formed such that it maintains the tail light in a substantially stable position during normal operation of the vehicle but is resiliently movable to permit substantial deflection of the tail light in both a forward direction and a sideways direction relative to the direction of the vehicle when the tail light is subjected to a deflecting force. The suspension mechanism resiliently urges the tail light to return to its stable position when the deflecting force is removed.

The suspension mechanism of one embodiment of the present invention comprises at least one spring steel rod (which is desirably circular in cross section but can have a square, rectangular or other cross-sectional shape) attached at one end to the vehicle, with the tail light being mounted at the other end. A forward extending loop lying in a vertical plane is formed between the upper and lower portions. This provides an enhanced deflection range for the tail light while still maintaining the tail light in a stable position during normal vehicle operation.

An elastic damping material formed of a flexible rubber or other elastomer desirably covers a portion of the spring member, particularly the loop and the interior space of the loop, to act as a shock absorber and further restrict tail light vibration while still permitting full deflection of the tail light under impact with an obstruction.

In the present invention the tail light is suspended from or attached to the suspension mechanism by means of a mounting bracket in which one of more tail lights is mounted. The mounting bracket comprises a transversely positioned mounting plate having one or more openings in which tail lights are mounted and preferably has outstanding peripheral edges that are positioned to engage an obstruction before the tail lights themselves hit the obstruction. An especially preferred mounting bracket has both vertical and horizontal attachment apertures to permit mounting of the assembly to either a vertical or horizontal structural member of the vehicle.

In one embodiment, a pair of tail lights are installed in a mounting plate and the resilient suspension mechanism employed comprises a pair of the curved spring rods described above attached at spaced locations along the upper edge of the mounting plate.

In another embodiment, the suspension mechanism comprises one or more coil springs in place of the steel rods described above.

In addition to providing a stable but deflectible mounting for the vehicle lights to avoid damage, the spring members employed as support members in the present invention also are advantageous in that they provide no space for collection of dirt, ice, or other road debris.

These and other advantages and features of the present invention will hereinafter appear and, for purposes of illustration, but not of limitation, preferred embodiments of the present invention are described in detail below and shown in the appended drawings.

DESCRIPTION OF PREFERRED EMBODIMENTS

Figure 1:
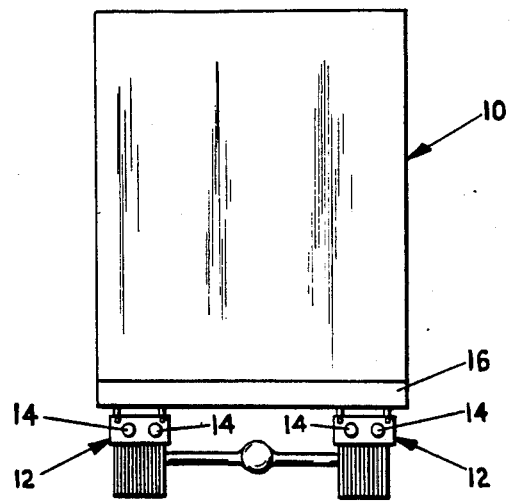
FIG. 1 is a rear elevational view showing one embodiment of the mounting mechanism of the present invention mounted on the rear of a semi-trailer.

Referring now to the drawings, a semi-trailer 10 is shown in FIG. 1 employing a pair of resilient mounting mechanisms 12 for supporting vehicle tail lights 14 from a rear cross member 16 of the trailer. While the present invention is being described in connection with the tail lights of a semi-trailer, it can also be used in connection with a truck or any other type of vehicle wherein vehicle lights are suspended in a similar manner.

The mounting mechanism 12 comprises a mounting bracket 18 in the form of a flat mounting plate 20 with upturned peripheral edges 22. The plate is positioned transversely with respect to the vehicle, and the upturned edges extend rearwardly a distance sufficient so that they extend further rearwardly than the lens of the tail lights. Thus, when the tail light assembly encounters an obstacle, the obstacle will hit the edges of the mounting plate as opposed to the lens of the tail light. The mounting plate is provided with openings 23 formed for mounting one or more tail lights therein. Two rounded openings are shown in the exemplary embodiment, but less openings or openings of different shapes for different shaped tail lights could be employed. The tail lights are held in the openings by rubber grommets or threaded fasteners 15 or similar attachment means.

Each mounting plate is fastened to the cross member of the trailer by means of a pair of resilient suspension or support members 28. The suspension members are attached at spaced intervals along the mounting plate (preferably at the upper corners of the plate) and extend upwardly to the underside of the vehicle cross member. The suspension members desirably are bolted by bolts 29 to the mounting plate and by bolts 31 to the cross member, which extend through openings in looped ends 33 and 35 of the suspension members. Other fastening means could be employed.

Each suspension member is formed of an elongated spring member 28 formed of spring steel rod and is attached at a lower end to the front of the mounting plate and extends upwardly therefrom to a forward facing loop 34 in the member. The loop curves forwardly and somewhat upwardly beyond the lower surface of the cross member of the vehicle, where it is bolted to the underside of the cross member.

The characteristics of the suspension members are an important feature of the present invention. It is desired that tail lights be maintained in a relatively stable or rigid position during normal operation of the vehicle. Thus, unnecessary vibration or oscillation of the mounting plate back and forth is not desirable. Spring steel rods of ¼ inch diameter having a loop of two inches diameter are desirable from this standpoint, because they hold the mounting plate in a relatively rigid and stable position during normal movement of the vehicle yet provide sufficient sideways and back and forth resiliency to permit substantial deflection of the mounting plate if the mounting plate encounters a fixed obstacle while the vehicle is moving. A round rod is not essential, as a square or rectangular rod could be used. If a flat bar is used, a bar having a ⅛ inch by 1 inch cross section is desirable.

Figure 2:
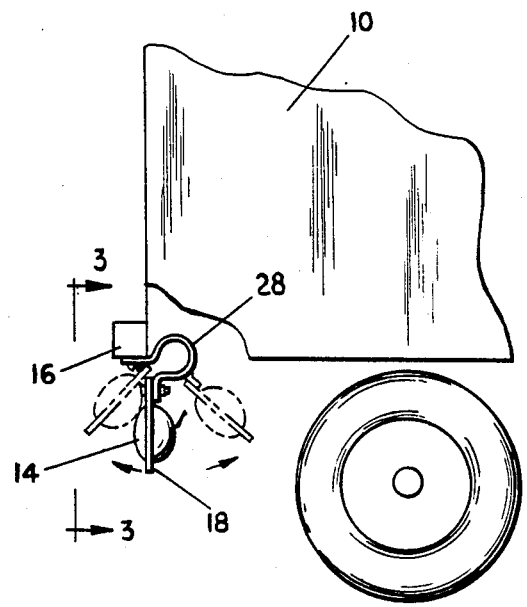
FIG. 2 is a side elevational view of the rear corner of a semi-trailer, partially broken away, showing the mounting mechanism of FIG. 1 attached to a cross member of the trailer.
Figure 3:
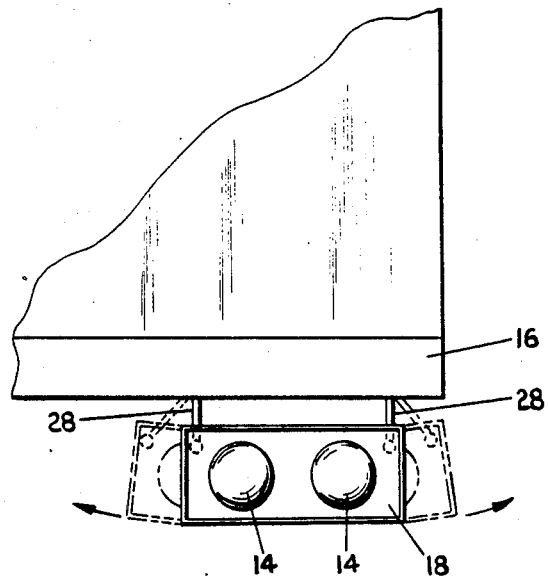
FIG. 3 is a rear elevational view taken along line 3—3 of FIG. 2.
Figure 4:
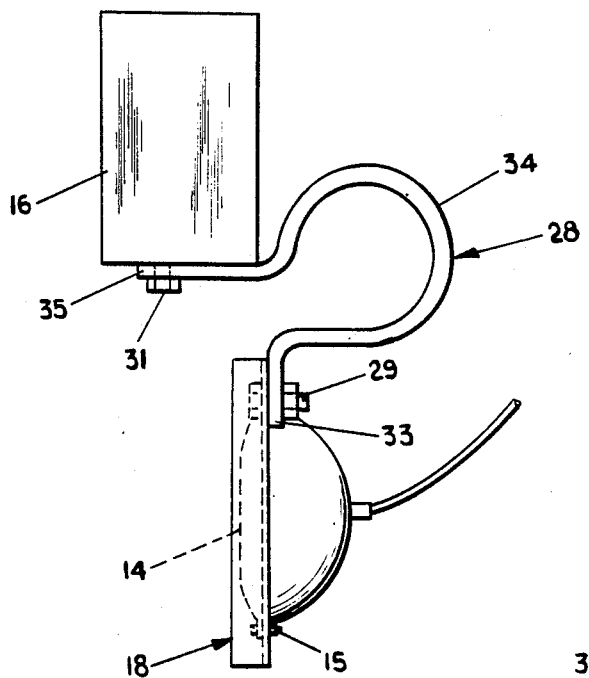
FIG. 4 is a side elevational view showing the mounting mechanism of FIG. 1 attached to a cross member of a trailer.
Figure 5:
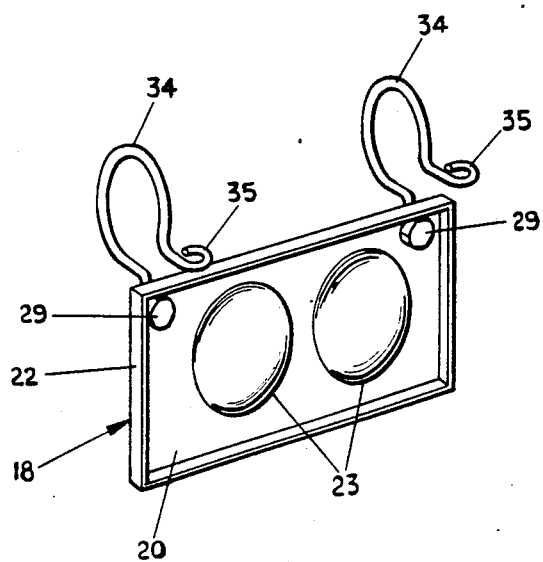
FIG. 5 is a perspective view of the mounting mechanism of FIG. 1.

The movement of the mounting plate of the present invention in response to forward and sidewards deflection is shown in FIGS. 2 and 3. It should be noted that movement both in a forward direction and in a reverse direction is permitted, as is movement in both sideways directions.

The foregoing spring support structure is desirable for several reasons. It provides a substantially stable mounting mechanism for the support plate. It does not readily vibrate during normal vehicle operation. At the same time, it permits deflection through a substantial distance in a forward and rearward direction, as well as in both sideways directions when an obstacle is encountered by the tail light assembly. In addition, the spring mechanism is stream-lined and unobtrusive so that it does not present any enclosed surfaces for collection of dirt, ice, or road debris. This minimizes upkeep and corrosion of the system.

Figure 6:
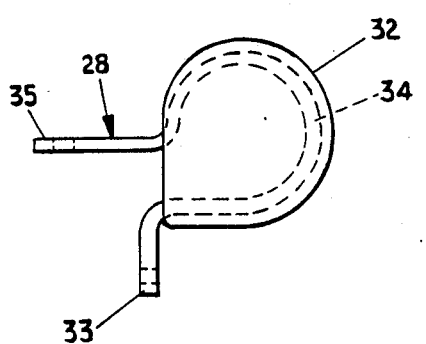
FIG. 6 is a side elevational view of the spring support member of FIG. 1 showing the use of an elastic damping material in the loop of the spring support member.

To provide additional protection against vibration of the mounting mechanism, shock or vibration absorbing or damping materials can be added to the resilient suspension members. Elastic shock absorbing material could be coated over the entire length of the suspension member or it could simply be coated over the loop in the support member as shown in FIG. 6. Elastic damping material 32 formed of rubber or some other suitable elastomer fills completely the loop 34 in the spring of FIG. 6 and covers the outer surface of the suspension members as well. The rubber is selected so that it is quite resilient and can deflect without tearing through the full range of motion contemplated for the suspension members and mounting bracket.

Another embodiment of the present invention is shown in FIGS. 7 through 10 wherein the elongated spring member 28 is replaced by a coil spring member 40. Coil spring 40 can be constructed of any durable spring materials such as spring steel, stainless steel and high strength resilient plastics. The primary criteria for the design specifications of coil spring 40 is that the spring rate be high enough so as not to permit vibration or oscillation of the tail light mounting bracket during the ordinary range of driving conditions, while deflecting forward, backward or to either side if a deflecting force is encountered by the tail light assembly to prevent damage.

Figure 7:
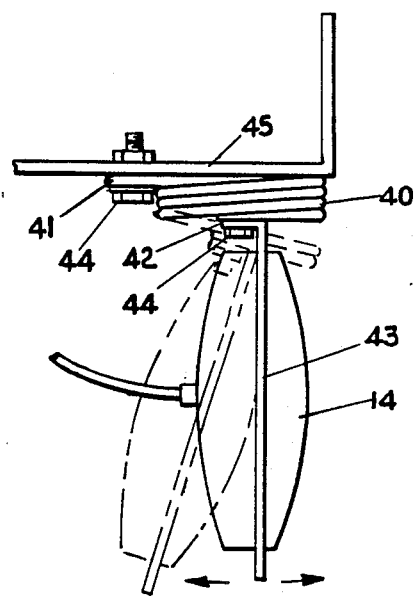
FIG. 7 is a side elevational view of another embodiment of the present invention mounted to the underside of a horizontal vehicle structural member.
Figure 8:
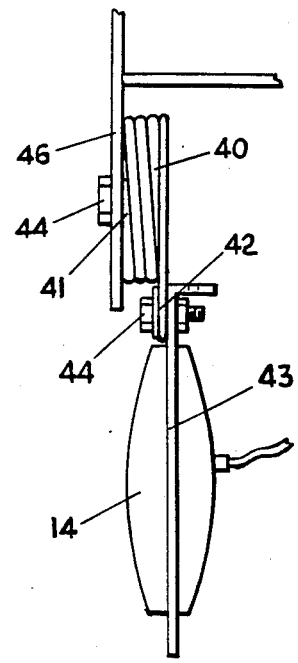
FIG. 8 is a side elevational view of the embodiment of FIG. 7 mounted to the back of a vertical vehicle structural member.

The method of mounting the embodiment of FIGS. 7 and 8 to a trailer or the like is similar to the method discussed above. Mounting loops are provided in each end of coil spring 40, loop 41 for mounting to a structural member of the trailer and loop 42 for mounting to mounting bracket 43. Conventional nuts and bolts 44 are most efficiently used for the mounting attachments.

Because tail light mounting locations can vary from trailer to trailer, a desirable feature of the coil spring embodiment of FIGS. 7 and 8 is that the assembly can be mounted to a horizontal trailer structural member 45, as shown in FIG. 7, with the plane of the coils of spring 40 generally perpendicular to the plane of the tail light 14, or to a vertical trailer structural member 46, as shown in FIG. 8, with the plane of the coils of spring 40 in the same general plane as tail light 14.

Figure 9:
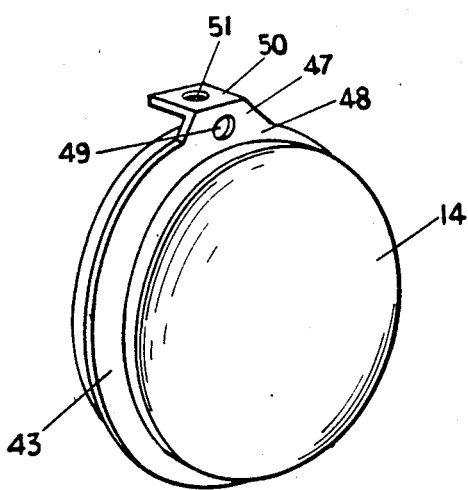
FIG. 9 is a top perspective view of the preferred mounting bracket and tail light assembly for use with the embodiments of FIGS. 7 and 8.

To facilitate these optional mounting planes, the use of a mounting bracket such as bracket 43 is preferred. As best shown in FIG. 9, bracket 43 has a top mounting flange 47 with a lower vertical portion 48 with mounting hole 49 and an upper horizontal portion 50 with a mounting hole 51. Bracket 43 thus obviates the need to inventory different brackets to accommodate the different mounting planes.

FIG. 7 illustrates in phantom the deflection of coil spring 40 when the tail light assembly encounters a forward deflection force.

Figure 10:
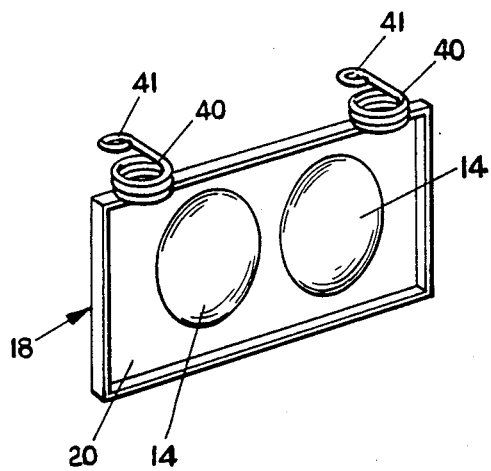
FIG. 10 is a perspective of a variation of the embodiment of FIGS. 7 and 8 utilizing a pair of coil spring members.

Finally, as in the embodiment described above, a plurality of tail lights can be mounted in a single bracket, and the corresponding suspension mechanism can comprise a plurality of coil springs 40. FIG. 10 illustrates an assembly with a pair of tail lights 14 and a pair of coil springs 40. As in bracket 43, both vertical and horizontal mounting holes can be provided in the bracket of FIG. 10 to accommodate mounting to a vertical or horizontal trailer structural member.

It should be understood that the foregoing embodiments are merely exemplary of the preferred practice of the present invention and that various changes and modifications may be made in the arrangements and details of construction of these embodiments without departing from the spirit and scope of the present invention.

The embodiments of the invention in which an exclusive property or privilege is claimed are defined as follows:

1. A vehicle light mounting means for suspending a vehicle light from a vehicle comprising resilient suspension means for connecting the light to the vehicle, the suspension means being formed of a resilient yieldable material that is formed and constructed such that it maintains the light in a substantially stable position during normal operation of the vehicle, the suspension means being resiliently movable on contact with a solid object such that the light can be substantially deflected in both a longitudinal direction and a sideways direction relative to the direction of the vehicle when the light is subjected to a deflecting force provided by such object, the suspension means urging the light to return to its stable position when the deflecting force is removed, the resilient suspension means comprising a spring member including an upper portion attached to the vehicle and a lower portion from which the light is suspended, the spring member including a loop formed between the upper and lower portions that enhances the deflection capabilities of the spring member, the loop serving to increase the range of resilient motion of the light.

2. Vehicle light mounting means for suspending a vehicle light from a vehicle comprising a resilient closed loop coil spring having one end attached to the vehicle and the other end adapted to be attached to the light, the spring being formed and constructed such that it maintains the light in a substantially stable position during normal operation of the vehicle but is resiliently movable on contact with a solid object such that the light can be substantially deflected in both a forward direction and a sideways direction relative to the direction of the vehicle when the light is subjected to a deflecting force provided by such object, the spring urging the light to return to its stable position when the deflecting force is removed.

3. A vehicle light mounting means for suspending a vehicle tail light from a vehicle comprising resilient suspension means for connecting the tail light to the vehicle, the suspension means being formed of a resiliently yieldable material that is biased to maintain the tail light in a substantially stable position during normal operation of the vehicle but is resiliently movable such that the tail light can be substantially deflected in both a forward direction and a sideways direction relative to the direction of the vehicle when the tail light is subjected to a deflecting force, the suspension means urging the tail light to return to its stable position when the deflecting force is removed, the suspension means comprising a spring member suspending the tail light from the vehicle and an elastic damping material contacting at least a portion of the spring member, the damping material serving to restrict vibratory oscillation of the spring member and tail light during normal vehicle operation while still permitting resilient deflection of the spring member and tail light when subjected to a deflecting force.

4. A vehicle light mounting means according to claim 3 wherein the spring member comprises a spring steel rod having means at an upper portion for attaching the spring member to the vehicle, the tail light being mounted on the spring member at a lower portion spaced from the upper portion, the spring rod having a loop formed wherein between the upper and lower portions, the loop serving to increase the range of resilient motion of the tail light, the elastic damping material covering at least the loop portion of the spring member.

5. A vehicle light mounting means according to claim 4 wherein the loop lies in a generally vertical plane and extends in a forward direction relative to the direction of the vehicle.

6. A vehicle light mounting means for suspending a vehicle light from a vehicle comprising resilient suspension means for connecting the light to the vehicle, the suspension means being formed of a resilient yieldable material that is formed and constructed such that it maintains the light in a substantially stable position during normal operation of the vehicle, the suspension means being resiliently movable on contact with a solid object such that the light can be substantially deflected in both a longitudinal direction and a sideways direction relative to the direction of the vehicle when the light is subjected to a deflecting force provided by such object, the suspension means urging the light to return to its stable position when the deflecting force is removed, the resilient suspension means comprising a spring member including an upper portion attached to the vehicle and a lower portion from which the light is suspended, the spring member including a loop formed between the upper and lower portions that enhances the deflection capabilities of the spring member, the loop serving to increase the range of resilient motion of the light, the resilient suspension means comprising a coil extension spring having one end attached to the vehicle and a second end from which the light is suspended, the coils being contiguous in an undeflected state and sufficiently rigid to prevent substantial oscillatory vibration of the light during normal driving operation of the vehicle, the coils being sufficiently resilient to permit longitudinal and sideways deflection of the mounting means when an obstacle is encountered.

7. Vehicle light mounting means according to claim 6 wherein said one end is adapted to be mounted on a horizontal surface of a vehicle structural member with the plane of the coils of said coil spring generally perpendicular to said vehicle light.

8. A vehicle light mounting means according to claim 2 wherein the spring is attached to the light and mounted on the vehicle in such a manner that movement of the light in one of a longitudinal direction or a lateral direction with respect to the vehicle causes the coils to deflect by bending along their axes such that the coils on one side of the spring open and the coils on the other side of the spring remain closed, with movement in the other direction causing the coils to deflect by a winding movement of the coils with respect to their axes.

9. A vehicle light mounting means according to claim 8 wherein the coil spring has three coils.

10. Vehicle light mounting means for suspending a vehicle light from a vehicle comprising:
 a mounting bracket in which the vehicle light is mounted; and
 resilient suspension means for suspending the mounting bracket from the vehicle, the suspension means interconnecting the mounting bracket and the vehicle and being constructed such that the mounting bracket is substantially stable during normal vehicle operation but is resiliently movable such that the mounting bracket can be deflected in both a longitudinal direction and a sideways direction with respect to the vehicle direction when the mounting bracket is subjected to a deflecting force provided by contact with a solid obstacle, the suspension means urging the mounting bracket to return to its original stable position when the deflecting force is removed, the resilient suspension means comprising spring means interconnecting the mounting bracket and the vehicle, the spring means being adapted to suspend the mounting bracket below a support member on the vehicle, the spring means being constructed such that the elastic yield is sufficiently low to prevent substantial vibratory oscillation of the light during normal vehicle operation, the spring means being sufficiently yieldable to permit enough deflection of the mounting means in longitudinal and sideways directions when an obstacle is encountered to substantially reduce the possibility of light and mounting bracket damage by the obstacle, the spring means having a loop formed therein that enhances the deflection capabilities of the spring means and serves to increase the range of resilient motion of the light.

11. Vehicle light mounting means according to claim 10 wherein the spring means comprises at least one elongated member formed of resilient metal and having an upper portion attached to the support member of the vehicle and a lower portion attached to the mounting bracket, the metal member being resilient in both forward and backwards directions and both sideways directions relative to the orientation of the vehicle such that the mounting bracket and light can be resiliently deflected in a forward, backward, or either sideways direction if the mounting bracket strikes an obstruction while the vehicle is moving.

12. Vehicle light mounting mechanism according to claim 11 wherein the resilient suspension means is formed of spring steel rod and includes an intermediate portion between the upper and lower portions of the rod that includes a curved loop extending in a direction parallel to the forward and backward orientation of the vehicle, the curved loop in the steel spring rod enhancing the deflection capabilities of the mounting bracket.

13. Vehicle light mounting means according to claim 12 wherein the mounting bracket comprises a mounting plate positioned transversely across the vehicle, with the light mounted in an opening in the mounting plate, the resilient suspension means comprising a pair of spring steel rods mounted at spaced apart locations on the mounting plate, with the loops in the rods extending forwardly of the mounting plate with respect to the direction of the vehicle.

14. Vehicle light mounting means according to claim 13 wherein the spring means includes elastic damping means for restricting vibration of the mounting bracket, the elastic damping means comprising a resilient, elastic damping material that covers the loop in the steel rod and interior portion of the loop.

15. A tail light assembly including resilient mounting means for suspending a vehicle tail light from a vehicle comprising:
 a tail light;
 a mounting bracket in which the vehicle tail light is mounted; and
 resilient suspension means for suspending the mounting bracket from the vehicle, the suspension means interconnecting the mounting bracket and the vehicle and being resiliently movable such that the mounting bracket is substantially stable during normal vehicle operation but can be deflected in both a forward direction and a sideways direction with respect to the vehicle directions when the mounting bracket is subjected to a deflecting force, the suspension means urging the mounting bracket to return to its original stable position when the deflecting force is removed;
 the mounting bracket comprising a mounting plate positioned transversely across the vehicle, the mounting plate being attached to the suspension means and having at least one opening therein in which the tail light is mounted by releasable fasteners, the tail light extending rearwardly beyond the rear surface of the mounting plate, the mounting plate having raised edges around the outer periphery thereof that extend rearwardly from the mounting plate further than the vehicle tail lights, the raised edges protecting the vehicle lights from being struck when the mounting bracket strikes an obstruction.

16. Vehicle light mounting means according to claim 10 wherein the spring means comprises at least one coil extension spring having one end attached to the support member of the vehicle and a second end attached to the mounting bracket, the coil spring having contiguous coils in an undeflected position of the mounting bracket during normal vehicle operation, the coil spring being resilient in both forward and backwards directions and both sideways directions relative to the orientation of the vehicle such that the mounting bracket and light can be resiliently deflected in a forward, backward, or either sideways direction if the mounting bracket strikes an obstruction while the vehicle is moving.

17. Vehicle light mounting means according to claim 16 wherein said one end is mounted on a horizontal surface of a vehicle structural member with the plane of the coils of said coil spring generally perpendicular to said vehicle light.

18. Vehicle light mounting means according to claim 16 wherein said one end is mounted on a vertical surface of a vehicle structural member with the plane of the coils of said coil spring generally parallel to the plane of said vehicle light.

19. Vehicle light mounting means according to claim 16 wherein the mounting bracket comprises a mounting plate positioned transversely across the vehicle, with the light mounted in an opening in the mounting plate, the resilient suspension means comprising a pair of coil springs mounted at spaced apart locations on the mounting plate.

20. Vehicle light mounting means according to claim 16 wherein said mounting bracket comprises a vertical mounting plate, with the light mounted in an opening in the mounting plate, and a top mounting flange attached to the vertical mounting plate, the top mounting flange having a lower vertical portion with a coil spring mounting hole therein and a top horizontal portion with a coil spring mounting hole therein.

21. A tail light mechanism including resilient mounting means for resiliently mounting vehicle tail lights from a support member in a vehicle comprising:

tail lights;

a mounting plate having openings therein and means for removably mounting the vehicle tail lights in the openings by releaseable fasteners, the mounting plate being adapted to be positioned transversely to the vehicle under the support member and having raised edges around the periphery thereof that extend rearwardly from the mounting plate a distance greater than the rearward extension of the vehicle tail lights such that the raised edges strike an obstruction encountered by the tail light assembly before the tail lights themselves contact the obstruction;

a pair of resilient suspension members for suspending the mounting plate and vehicle lights from the support member of the vehicle, the suspension members being spaced apart transversely and extending downwardly from the vehicle support member to the mounting plate, an upper end of each suspension member being adapted to be attached to the support member of the vehicle and the lower end of each suspension member being adapted to be attached to the mounting plate, each suspension member comprising an elongated resilient rod having a looped portion between the upper and lower ends, with the loop lying in a vertical plane parallel to the direction of the vehicle, the resilience of the support members being such that the mounting plate can be deflected in a forward or backward direction or either sideways direction with respect to a normal, stable position of the mounting plate, the support members holding the mounting plate relatively stable in its normal position during normal operation of the vehicle but permitting deflection of the mounting plate when the mounting plate encounters an obstacle, the resilient support members permitting deflection of the mounting bracket and tail lights rather than permitting permanent damage to the light assembly when the mounting plate strikes an obstacle; and elastic damping means for restricting oscillatory vibration of the mounting bracket, the elastic damping means comprising an elastic material that covers the loop in the support members and fills in the open interior portions of the loops.

* * * * *